United States Patent [19]

Kennard, Jr.

[11] Patent Number: 4,877,208

[45] Date of Patent: Oct. 31, 1989

[54] SUPPORT FOR MIXER BUCKETS

[76] Inventor: Edsel Kennard, Jr., 310 Shipley Rd., Apt. 112, Wilmington, Del. 19809

[21] Appl. No.: 200,237

[22] Filed: May 31, 1988

[51] Int. Cl.[4] .............................................. A47G 23/02
[52] U.S. Cl. .................................... 248/146; 248/678; 248/687; 366/605
[58] Field of Search .................... 248/146, 346, 359.1, 248/676, 678, 314, DIG. 7, DIG. 10, 519; 366/605, 279, 349

[56] References Cited

U.S. PATENT DOCUMENTS

| 1,760,153 | 5/1930 | Luce, Jr. ........................... 248/359.1 |
| 2,625,130 | 1/1953 | Morser ............................. 248/519 X |
| 3,201,075 | 8/1965 | Sievers ............................ 248/146 X |
| 3,520,505 | 7/1970 | Allen ................................ 248/146 |
| 4,145,044 | 3/1979 | Wilson et al. ................... 248/519 X |
| 4,201,975 | 5/1980 | Marcus ............................ 248/519 X |
| 4,275,535 | 6/1981 | Stalzer ............................ 248/519 X |

Primary Examiner—Ramon O. Ramirez
Attorney, Agent, or Firm—Connolly & Hutz

[57] ABSTRACT

A support for a mixer bucket includes a raised platform having a recess shaped to accommodate a mixer bucket. Resistance means are provided in the recess which engage against the bucket to maintain the bucket stationary while the contents of the bucket are being mixed.

8 Claims, 1 Drawing Sheet

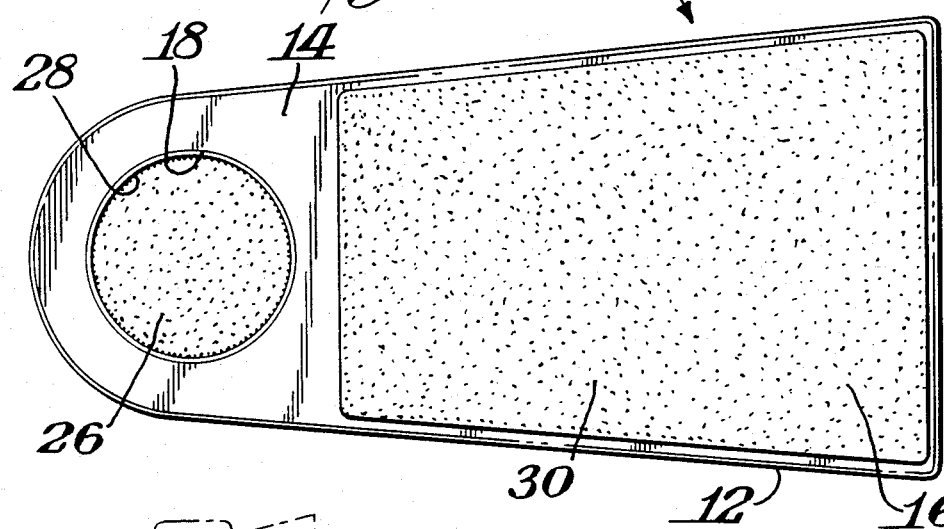
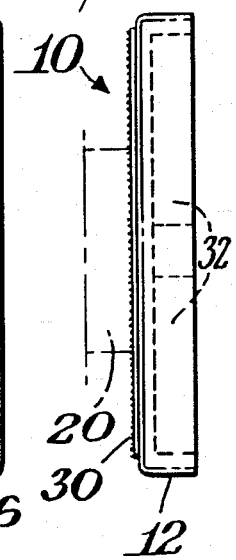
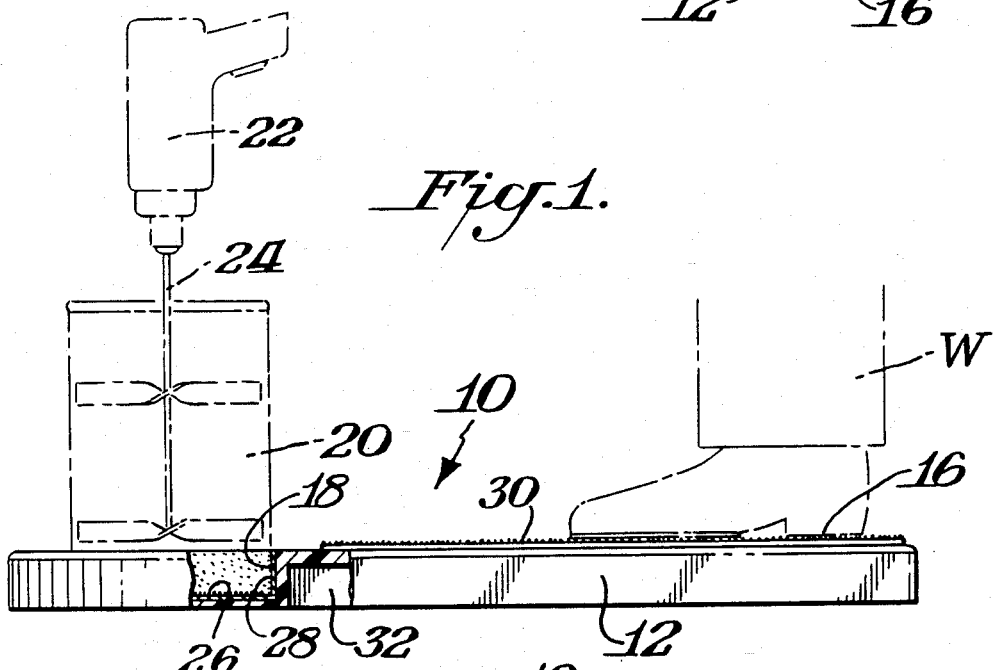
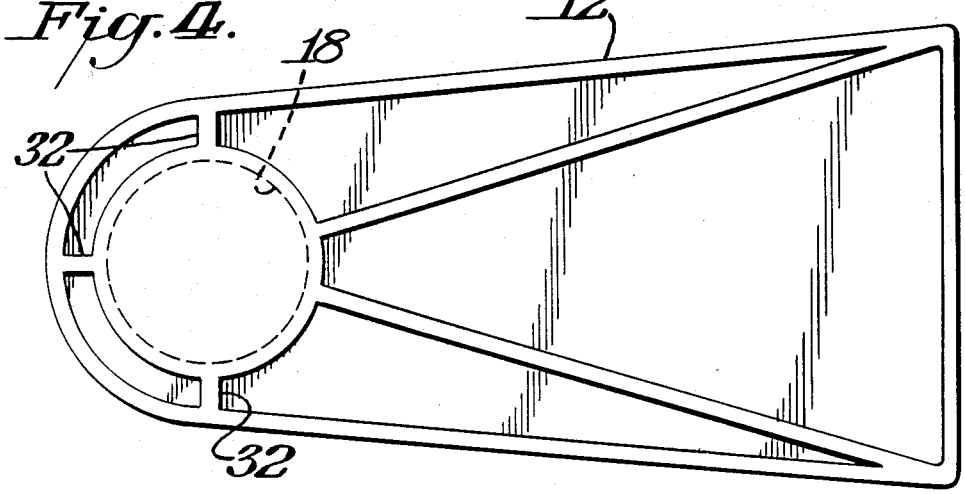

SUPPORT FOR MIXER BUCKETS

BACKGROUND OF INVENTION

In construction work various techniques are used for mixing ingredients. Generally, these techniques include placing the ingredients into a bucket having a circular cross-section. After the ingredients are placed in the bucket a mixing device is inserted in the bucket to stir the contents. For example, one practice is known as a quicker mixer technique wherein ready to mix joint compound ingredients are pre-packaged in a stationary bucket. The ingredients are mixed using a heavy duty drill at the job site. A disadvantage with this practice is that the stirring or mixing causes the bucket to rotate or otherwise move. It would be desirable if some means could be provided to maintain such a bucket stationary while the ingredients are being mixed.

SUMMARY OF INVENTION

An object of this invention is to provide a support for mixer buckets wherein the ingredients in the bucket can be mixed or stirred while the bucket is maintained stationary so as to facilitate the on site mixing of the components.

A further object of this invention is to provide such a support which is simple in operation and economical to manufacture.

In accordance with this invention the support is in the form of a raised platform having a recess shaped to generally conform to the shape of the bucket. Resistance means are provided in the recess to engage against the bucket when the bucket is inserted into the recess. As a result, when the contents of the bucket are being stirred, or mixed, the resistance means maintains the bucket stationary.

In a preferred form of this invention, the resistance means is in the form of non-skid material at the bottom and sides of the recess. The non-skid material acts in cooperation with force sufficient to maintain the bucket stationary.

In accordance with a further feature of this material the support is formed as a one piece molded product having an extension on which the user may stand, preferably the extension also is covered with non-skid material.

THE DRAWINGS

FIG. 1 is a side elevation view partly in section showing a support in accordance with this invention;

FIG. 2 is a top plan view of the support shown in FIG. 1;

FIG. 3 is a end elevation view of the support shown in FIGS. 1-2; and

FIG. 4 a bottom plan view of the support shown in FIGS. 1-3.

DETAILED DESCRIPTION

The present invention relates to a support for holding a mixer bucket stationary. As illustrated in the drawings, the support 10 includes a raised platform 12 having two sections, namely a bucket support section 14 and a contiguous worker support section 16. The bucket support section has an annular recess 18 of circular cross-section conforming in size and shape to a conventional bucket or container 20 which is used for mixing the ingredients at a construction site. As illustrated in FIG. 1, the bucket 20 would contain the individual components or ingredients such as in a ready mix joint compound and these ingredients would be stirred by a heavy duty drill 22 having a stirring bit 24. In conventional practice when such a stirring technique is used there is a tendency for the bucket to rotate and/or move laterally as a result of the stirring action.

The disadvantages indicated above with respect to conventional practices is avoided by the support 10. In this respect, resistance means are provided in the recess 18 to engage the bucket and maintain it stationary during the mixing action. Any suitable form of resistance means such as clamps, weights, wedges or other device may be used within the broad concept of this invention. The drawings however, illustrate the preferred practice which is particularly advantageous over other forms due to its simplicity, thus lending itself to the advantages of low cost in manufacture and simplicity in use. The resistance means in accordance with the preferred practice of this invention involves providing a non-skid or non-slip material 26 at the bottom of recess 18 and similarly, non-skid material 28 completely around the sides of recess 18. Any suitable non-skid material may be used. Such materials for example, have been used in bathtubs or such material may take the form similar to sand paper having particles thereon which would provide a frictional force against the bucket 20. The invention involves making use of the heavy weight resulting from the contents of the bucket and the bucket itself being in contact with the non-skid material so as to provide a frictional force when the contents are stirred by drill 22. This frictional force would be sufficient to overcome any tendency of the bucket to rotate and/or otherwise move laterally. As can be appreciated the preferred practice of this invention thus automatically results in maintaining the bucket stationary without the user being required to preform any particular manipulations such as activating clamps etc. All that need be done is for the user to place the bucket into recess 18 and then perform the normal mixing techniques which automatically results in creating a sufficient resistance to maintain the bucket stationary.

A further feature of this invention is to provide such non-skid material 30 on worker support section 16 so as to facilitate the worker remaining stationary during the mixing operation and thus not tend to slip off the platform during the on-site mixing.

In the preferred practice of this invention support 10 is made of a one-piece molded product from any suitable material such as fiberglass or conventional plastics. Thus, support 10 is formed of uniform thickness as illustrated. FIG. 4 illustrates a bottom plan view of support 10. As shown therein a plurality of reinforcing ribs 32 are located on the underside of support 10 to provide the necessary stability to maintain sufficient rigidity of support 10. Preferably, recess 18 is formed from a pocket integral with support 10. Within the broad concepts of this invention, however, it is possible to mold support 10 by having an opening provided in the area of recess 18 and to form the recess in a separate pocket which is inserted into the opening of support 10. In such case, it would be preferable if the pocket insert is of non-circular shape to conform to a similar non-circular opening in platform 10 so that the insert pocket would not rotate. Such use of a separate pocket, however, is not as preferred as the making of the pocket integral with the remainder of support 10.

The drawings illustrate to scale support 10 for use with a five gallon bucket 20. In this embodiment, support 10 has an overall length of three feet and is two feet wide at its largest width at the end of worker support section 16. Support 10 tapers inwardly until a diameter is reached at recess 18 whereupon the bucket support section 14 of support 10 is then formed over an arc of uniform radius. Recess 18 is disposed three inches from the extreme outer end of support 10. The height of support 10 is also three inches. It should thus be appreciated that the invention may be practiced with a platform which is raised only a short distance and thus recess 18 may be a shallow recess of almost three inches in height since it is not necessary to provide an extremely large contact area between bucket 20 and the non-skid surfaces.

As can be appreciated the invention may be practiced in a very simple manner by having the worker W stand on worker support section 16 after inserting the bucket 20 in recess 18. The ingredients to be mixed are also inserted in bucket 20 and a stirring device such as drill 22 is then actuated so that the stirrer 24 effectively mixes the ingredients in bucket 20. Bucket 20 is maintained stationary by means of the frictional contact between bucket 20 and the non-skid surfaces 26, 28 which, as a result of the weight of the bucket and its contents, provides a sufficient amount of frictional force to resist any tendency for movement of the bucket. During this mixing action the worker remains standing on support section 16 facilitated by the non-skid surface 30.

What is claimed is:

1. A support for a mixer bucket comprising a raised platform, said platform having a bucket support section, an annular recess in said bucket support section whereby a mixer bucket of circular cross section may be inserted into said recess, said recess having a bottom and a peripheral side wall, resistance means in said recess for engagement with the bucket to maintain the bucket stationary while the contents of the bucket are being mixed, and said resistance means comprising non-skid material mounted to said bottom and around said peripheral side wall of said recess.

2. The support of claim 1, in combination therewith, a mixer bucket of circular cross section being in said recess in contact with said bottom and with said peripheral side wall, and said mixer bucket having joint compound ingredients therein.

3. The support of claim 1 wherein said platform includes a worker support section contiguous to said bucket support section whereby a worker may stand on said platform while mixing the contents of the bucket.

4. The support of claim 3 including non-skid material over a substantial portion of said worker support section.

5. The support of claim 4 wherein said platform is made entirely of a one piece molded material.

6. The support of claim 3 wherein said recess is a shallow recess.

7. The support of claim 6 wherein said worker support section is trapazoidally shaped, said bucket support section being an arcuate extension of said worker support section, and the widest dimension of said worker support section being at the end of said platform remote from said, bucket support section.

8. The support of claim 7 wherein said platform is of uniform height.

* * * * *